United States Patent [19]

Tench et al.

[11] Patent Number: 5,304,297
[45] Date of Patent: Apr. 19, 1994

[54] REDUCING AGENT REGENERATION SYSTEM

[75] Inventors: D. Morgan Tench, Ventura; Dennis P. Anderson, Newbury Park; Leslie F. Warren, Jr., Camarillo, all of Calif.

[73] Assignee: Rockwell International Corporation, Seal Beach, Calif.

[21] Appl. No.: 23,653

[22] Filed: Feb. 26, 1993

[51] Int. Cl.$^5$ .................. C25D 5/02; C25D 17/00
[52] U.S. Cl. ..................... 205/101; 205/125; 204/232
[58] Field of Search .............. 205/101, 125; 204/232

[56] References Cited

U.S. PATENT DOCUMENTS 5,104,494  4/1992  Tench et al. .................... 205/125

*Primary Examiner*—T. M. Tufariello
*Attorney, Agent, or Firm*—John C. McFarren

[57] ABSTRACT

A system is provided for regenerating reducing agents used in ancillary chemical or electrochemical processes such as restoring solderability of electronic components. The system includes a cathode, an anode, and an electrolyte system that is separated by a semipermeable ionic barrier into a catholyte and an anolyte. The catholyte includes the reduced member of a redox couple, which can be regenerated electrochemically. The redox couple of the electrolyte system is charged like a battery and discharged during the ancillary process. Regeneration of the reduced member of the redox couple is accomplished at the cathode. The cathode comprises an electrode having a high hydrogen overvoltage so that sufficiently negative potentials can be attained while minimizing hydrogen evolution. Chemical balance is maintained by the semipermeable ionic barrier, which permits proton migration from the anolyte to the catholyte but acts as a barrier against diffusion and migration of cations from the catholyte to the anolyte. Ideally, the anodic reaction is breakdown of water to form oxygen, which is vented, and protons that migrate across the ionic barrier to the catholyte replacing protons consumed in the ancillary process. The overall reaction in a system for restoring solderability of electronic components is reduction of metallic oxide to metal and release of oxygen, with no net chemical change in the composition of the regeneration system.

18 Claims, 1 Drawing Sheet

REDUCING AGENT REGENERATION SYSTEM

TECHNICAL FIELD

The present invention relates to electrochemistry and, in particular, to an electrochemical method of regenerating reducing agents that become oxidized in the course of a chemical or electrochemical process.

BACKGROUND OF THE INVENTION

Electrochemical regeneration of reducing agents is useful in on-going chemical or electrochemical processes such as synthesizing organic compounds or restoring solderability of electronic components, for example. A method of restoring solderability of electronic components, to which the present invention is applicable, is described in U.S. Pat. No. 5,104,494 issued Apr. 14, 1992, the teachings of which are incorporated herein by reference. Metallic oxides, when present on solderable portions of electronic components, are detrimental to solderability of the components. In the patented process, a reducing agent is used to reduce the detrimental oxides to their metallic state, thereby restoring solderability of the electronic components. During this process, however, the reducing agent becomes depleted and must be replenished. Thus, in any large-scale electronic component soldering system using the patented method for restoring and/or ensuring solderability of electronic components, there is a need for a further process for regenerating the reducing agent so that the overall soldering system can be run efficiently, without interruption, and without generation of environmentally objectionable by-products.

SUMMARY OF THE INVENTION

The present invention comprises a process of regenerating reducing agents such as those used in restoring solderability of electronic components. In the process of restoring solderability, which is described herein as an example (but not a limitation) of a system to which the present invention is applicable, reducing agents are used to reduce detrimental metallic oxides found on the surfaces of solderable portions of electronic components. The present system for regenerating the reducing agents includes a cathode, an inert anode, and a catholyte and anolyte that are separated by a semipermeable ionic barrier. The catholyte includes an aqueous electrolyte containing a redox couple comprising a reduced member and an oxidized member. The anolyte includes a supporting electrolyte without the redox couple. The reducing agent, which comprises the reduced member of the redox couple and which can be regenerated electrochemically, reduces metallic oxides to the metallic state without a direct electrical connection to the oxide-coated part (i.e., "electrolessly"). The electrolyte system is charged like a battery and discharged on the solderable part to remove its surface oxides. Regeneration of the reduced member of the redox couple is accomplished at the cathode. The cathode comprises an electrode having a high hydrogen overvoltage (such as lead, mercury, indium, antimony, tantalum, bismuth, arsenic, carbon, cadmium, thallium, tin, or alloys thereof, for example) so that sufficiently negative potentials can be attained while minimizing hydrogen evolution from the reduction of protons ($H^+$) in the water. Chemical balance is maintained in the system by the semipermeable ionic barrier (e.g., a microporous glass separator), which permits proton migration from the anolyte to the catholyte but acts as a barrier against diffusion and/or migration of cations to the anolyte from the catholyte. Ideally, the anodic reaction is breakdown of water to form oxygen, which is vented, and protons that migrate across the ionic barrier to the catholyte, thereby replacing protons consumed in the metallic oxide reduction process. The overall system reaction is reduction of the metallic oxide to metal (and water) and oxidation of water to oxygen. Since the amount of water consumed equals that released during metallic oxide reduction, the net chemical change for the regeneration system is the release of oxygen, which is vented to the atmosphere. Water lost from the anolyte can simply be replenished, and excess water generated in the catholyte can be removed by reverse-osmosis or gas sparging and evaporation, for example.

A principal object of the invention is the regeneration of reducing agents used in chemical or electrochemical processes such as that of restoring solderability of electronic components. A feature of the invention is a semipermeable ionic barrier that separates the anolyte from the catholyte, which contains the reduced member of a redox couple as the reducing agent. An advantage of the invention is a closed-loop process that continuously regenerates the reducing agent and eliminates waste disposal problems.

BRIEF DESCRIPTION OF THE DRAWINGS

For a more complete understanding of the present invention and for further advantages thereof, the following Detailed Description of the Invention makes reference to the accompanying Drawings, in which.

DETAILED DESCRIPTION OF THE INVENTION

Figure 1:
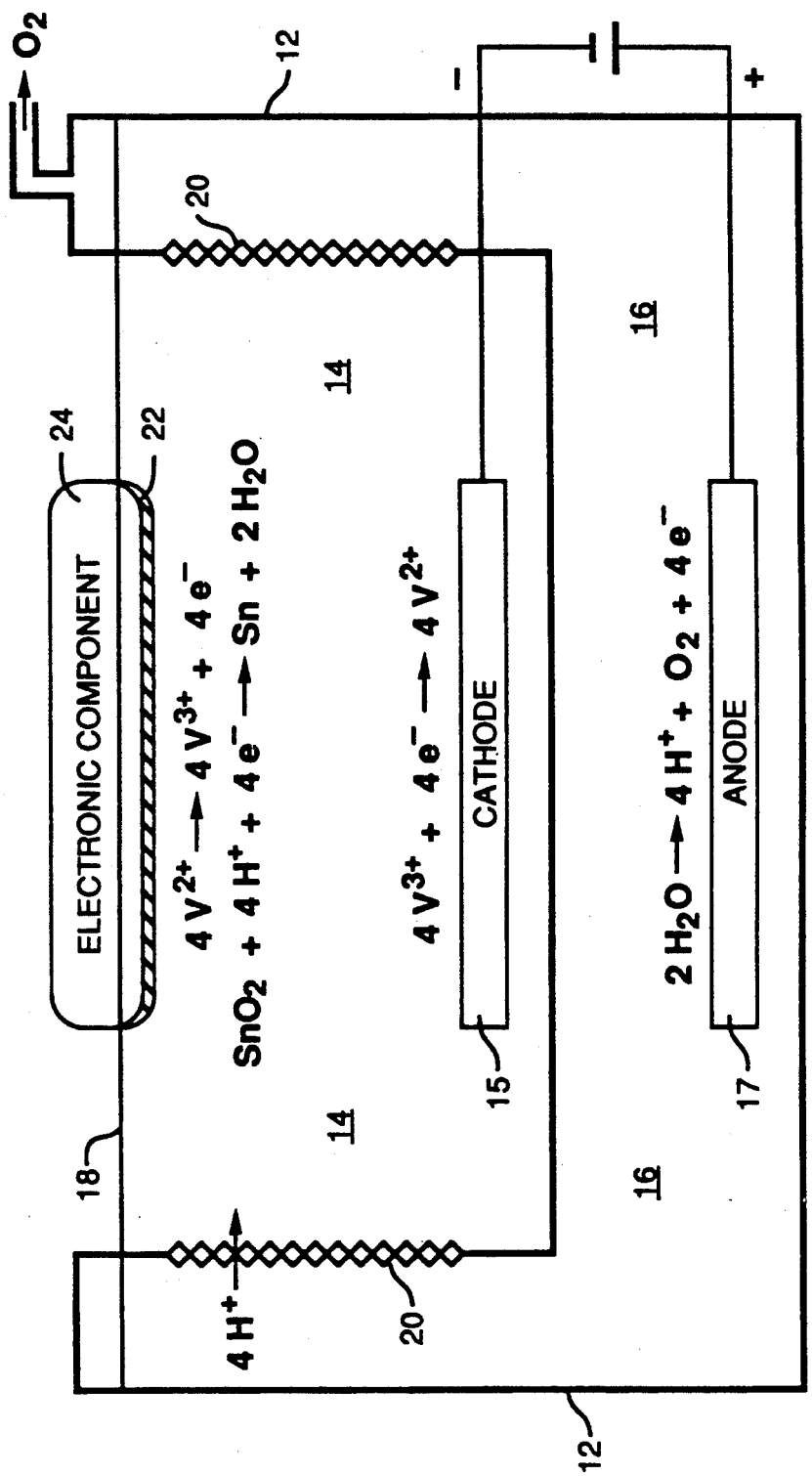
FIG. 1 is a schematic, cross-sectional view of a reducing agent regeneration system of the present invention as used in an exemplary process of restoring solderability of electronic components.

The present invention comprises a method and apparatus for regenerating reducing agents used in chemical or electrochemical processes such as synthesis of organic compounds or restoring solderability of electronic components. By way of example, and not limitation, the system of the present invention is described below in conjunction with a method of restoring the solderability of electronic components, such as printed wiring boards. The electrochemical system of the invention includes an anode and a cathode in aqueous electrolyte solutions. The electrolytes are contained in a vessel having one compartment for the cathode and catholyte and a second compartment for the anode and anolyte. The catholyte comprises an electrolyte with a redox couple, such as ions of vanadium or chromium, for example, comprising a reduced member and an oxidized member. The anolyte comprises a supporting electrolyte without the redox couple. The supporting electrolytes for the catholyte and the anolyte may have different pH values and may involve different anions in some cases. The reducing agent, which comprises the reduced member of the redox couple and which is used in the exemplary process to reduce detrimental metallic oxides on solderable portions of electronic components, is generated at the cathode by electrochemical reduction of the oxidized member of the redox couple in the catholyte. Without a separate compartment for the anolyte, the reduction process would be reversed at the anode (to a large extent) so that regeneration of the reducing agent would be very inefficient. For sustained operation, the anolyte and catholyte must be separated by a semipermeable ionic barrier that allows protons to migrate from the anolyte to the catholyte but effectively opposes diffusion and migration of reducing agent cations across the barrier from the catholyte to the anolyte. This is necessary to minimize loss of the reducing agent and to avoid the anodic formation of higher-valent species, such as hexavalent chromium, for example, that may be environmentally objectionable.

The semipermeable ionic barrier is an important feature of the present invention. Porous separators are known and have been used in prior art electrochemical cells as "diffusion barriers." Because the polarity of typical separated cells is switched periodically, as between charging and discharging a battery, for example, the semipermeable nature of porous separators has not been fully exploited in electrochemical cells. We have discovered that a porous separator having an applied voltage is very effective in preventing transport of cations in one direction and anions in the other, especially when the pores are so small that "dead areas" are avoided. Because migration is typically a fast process compared with diffusion, back diffusion against the direction of migration for a given type of ion is small. For example, no discoloration of a pH 0.5 sulfuric acid solution anolyte was found to occur in a cell having a 0.8M vanadous sulfate (which is colored) and sulfuric acid catholyte (pH 0.5) and an anolyte/catholyte separator of microporous glass (pore size 5–10 nm) under an applied voltage, even after many weeks of operation. When the applied voltage was switched off, however, diffusion of vanadium ions from the catholyte across the porous separator caused noticeable discoloration of the anolyte solution within one day.

In the ideal system of the present invention, as applied to the exemplary method of restoring solderability, the reduced member of the redox couple provides electrons to reduce metallic oxides (such as stannic oxide, for example, indicated as $SnO_2$ in FIG. 1) present on the surface of solder coatings on electronic components. The reaction oxidizes the reduced member of the redox couple (e.g., $V^{2+}$ to $V^{3+}$) and consumes protons ($H^+$) to convert metallic oxides ($M_xO_y$) to metal (M) and water ($H_2O$). The half-cell reactions and overall reaction for electroless reduction of stannic oxide by vanadium ions, as an example, are as follows:

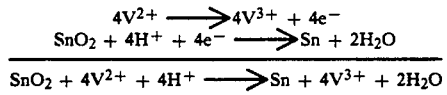

At the cathode, the oxidized member of the redox couple is returned to its reduced state (e.g., $V^{3+}$ to $V^{2+}$). At the anode, water is broken down into oxygen ($O_2$), which is vented from the system, and protons ($H^+$) that migrate across the ionic barrier to replace those consumed in the metallic oxide reduction at the electronic component. The electrode half-cell reactions and overall reaction for the electrochemical regeneration of the reduced member ($V^{2+}$) of the redox couple are as follows:

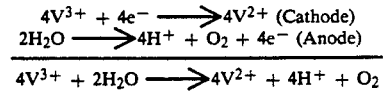

The overall system reaction is the sum of the electroless metallic oxide reduction and the electrochemical regeneration reactions, summarized as follows:

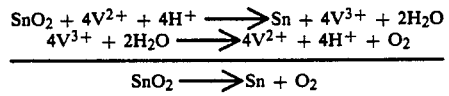

Thus, the overall system reaction in this example is conversion of stannic oxide ($SnO_2$) to tin metal (Sn) and oxygen ($O_2$), with no net chemical change in the composition of the regeneration system. The overall reactions for reduction of other metallic oxides (or hydroxides), such as SnO, PbO, and CuO, for example, are similar to those expressed above for $SnO_2$.

A schematic representation of a preferred embodiment of the regeneration system of the present invention is illustrated in FIG. 1, using metallic oxide reduction for restoration of solderability as an exemplary process. The system includes a vessel 12 having two compartments for holding electrolyte solutions, comprising a catholyte 14 and an anolyte 16, at a fluid level 18. A first compartment of vessel 12 contains the catholyte solution 14 and a cathode 15. A second compartment of vessel 12 contains the anolyte solution 16 and an anode 17. Catholyte 14 and anolyte 16 are separated by a semipermeable ionic barrier 20. Ionic barrier 20, which may comprise a microporous glass separator (such as the Vycor ® brand glass known as "thirsty" glass, for example, which has an average pore diameter in the range of 5 to 10 nm), provides microchannels between catholyte 14 and anolyte 16 that are under the influence of an electric field when a voltage is applied between cathode 15 and anode 17. During regeneration of the reducing agent, the electric field produced across semipermeable ionic barrier 20 causes migration (i.e., movement under an applied electric field) of protons from anolyte 16 to catholyte 14, but opposes diffusion (and migration) of cations from catholyte 14 to anolyte 16.

In the preferred system, catholyte 14 comprises an aqueous solution of vanadous sulfate ($VSO_4$) reducing agent and sulfuric acid. Chromous sulfate ($CrSO_4$) may also be used as the reducing agent, but it is less desirable in the exemplary process of solderability restoration for the reasons explained below. For effective metallic oxide reduction, the pH of catholyte 14 should be less than about 1.0 and the reducing agent concentration should be at least 0.1M. The ions of vanadium ($V^{2+}/V^{3+}$) or chromium ($Cr^{2+}/Cr^{3+}$) provide a redox couple for the reduction of metallic oxides 22 on solderable portions of an electronic component 24, such as a printed wiring board, for example, in contact with catholyte 14. Anolyte 16 may be a solution of a salt, base, or acid, but it should be chosen to maintain chemical balance within the system and not produce undesirable or hazardous by-products. With vanadous sulfate and sulfuric acid as catholyte 14, a preferred anolyte 16 is a sulfuric acid solution. Sulfuric acid anolyte solution 16 produces only oxygen and protons ($H^+$) at anode 17.

Protons (H+) migrate across semipermeable ionic barrier 20 to replenish protons consumed during reduction of metallic oxides on component 24, while the oxygen may be vented from the anolyte compartment, as illustrated in FIG. 1.

Under some conditions, anions may migrate across ionic barrier 20 from catholyte 14 to anolyte 16, thereby increasing the acidity of anolyte 16 and decreasing the acidity of catholyte 14. Such anion migration can be minimized by operating the system with excess anolyte acidity. In any case, the acidity balance between catholyte 14 and anolyte 16 can be maintained by transferring a portion of anolyte 16 into catholyte 14 as needed. This may be accomplished, for example, by maintaining the fluid level of anolyte 16 above that of catholyte 14 so that there is a pressure differential causing anolyte 16 to flow slowly into catholyte 14 through ionic barrier 20. Excess water can be removed from catholyte 14 by evaporation using inert gas bubbling, for example, which also provides a blanket of inert gas to prevent oxidation of the reducing agent by oxygen from the atmosphere. An alternative method for removing excess water from catholyte 14 is reverse-osmosis, which is commmonly used for water desalination. Water lost from anolyte 16 can be readily replenished. Anode 17 may comprise any inert material that is electrically conducting, but preferably a good oxygen evolution catalyst, such as platinized titanium or titanium-ruthenium oxide, for example.

As stated above, ions of chromium ($Cr^{2+}/Cr^{3+}$) may also be used as the redox couple, but chromium has some undesirable attributes when used in the exemplary process of restoring solderability. When chromium sulfate is used in catholyte 14, residues that increase solder wetting time may be left on the surface of component 24. The increased wetting time, which has been observed for Sn-Pb surfaces, may be caused by strong adsorption of chromium species and the possible formation of adsorbed $Cr^{3+}$ oxide. Furthermore, chromium apparently forms a negatively charged complex with sulfate so that it is also transported into the anolyte during initial charging of the cell when sulfate is the primary current carrier across ionic barrier 20. On the other hand, the $Cr^{2+}/Cr^{3+}$ couple has a more negative redox potential than $V^{2+}/V^{3+}$, indicating that $Cr^{2+}$ is more reducing than $V^{2+}$ and may have advantages for use in some processes. As a further example, ions of europium ($Eu^{2+}/Eu^{3+}$) may also be used as the redox couple. The redox potential of the $Eu^{2+}/Eu^{3+}$ couple lies between those of the $V^{2+}/V^{3+}$ and $Cr^{2+}/Cr^{3+}$ couples.

Anions other than sulfate may also be used in the reducing agent regeneration system of the present invention. However, some anions (such as fluoride nitrate, oxalate, and cyanide, for example) are unstable in acid solution and/or in the presence of highly reducing $M^{2+}$ ions (such as $V^{2+}$ and $Cr^{2+}$, for example) and therefore are less desirable for most applications. Chloride anions are also considered undesirable because they would be oxidized to poisonous chloride gas if present in the anolyte. Other electrochemically stable anions that may be useful in systems involving reducing agent regeneration include tetrafluoroborate, trifluoromethanesulfonate, and perchlorate (which is stable in the presence of $Cr^{2+}$ and $Eu^{2+}$, but not $V^{2+}$).

The material of cathode 15 should have a high hydrogen overvoltage (e.g., mercury, lead, indium, antimony, tantalum, bismuth, arsenic, carbon, cadmium, thallium, tin, or alloys thereof) so that most of the current goes to regenerating the reducing agent rather than discharging protons to hydrogen gas. Mercury is less desirable because it has limited surface area (i.e., inefficient for reducing agent regeneration), is hazardous to handle (i.e., liquid and toxic), and can dissolve in the electrolyte under some conditions. A preferred cathode material is lead (Pb) or a lead alloy, particularly for a system comprising a sulfate anion in catholyte 14. Lead has one of the highest hydrogen overvoltages of the common metals, is easy to handle, and is readily available in a form having a high surface area. In addition, lead forms an insoluble sulfate which prevents dissolution in sulfate-containing electrolytes when the redox couple is discharged (e.g., during shutdown or storage of the regeneration system). An alternative cathode material is carbon, which has a very high hydrogen overvoltage and is not subject to dissolution in aqueous electrolytes.

The preferred system for practicing the present invention comprises a lead or lead alloy cathode 15, a vanadous sulfate ($VSO_4$) and sulfuric acid catholyte 14 (having a pH of less than 1.0 and a $VSO_4$ concentration of at least 0.1M), and a sulfuric acid anolyte 16. The sulfate ion is very stable and prevents dissolution of lead or lead alloy cathode 15 by forming an insoluble sulfate on cathode 15. In addition, vanadium sulfate residues left on Sn-Pb coated components 24 treated to reduce surface oxides do not significantly affect solderability of the Sn-Pb coated components 24. Furthermore, vanadium ions (unlike those of chromium) apparently do not form negatively-charged complexes with sulfate. This is based on the observation that very little vanadium is transported from catholyte 14 to anolyte 16 during reduction of the vanadyl species ($VO^{2+}$), which involves migration of sulfate anions from catholyte 14 to anolyte 16. Based on atomic absorption (AA) analysis of the anolyte for vanadium after a cell has been fully charged beginning with the vanadyl species ($VO^{2+}$), vanadium ion migration accounts for less than one part in ten thousand of the total charge passed.

The method of the present invention for regenerating reducing agents can also be used to initially produce reducing agents. For example, the half-cell electrode reactions and overall reaction for reduction of vanadyl to vanadic species may be expressed as:

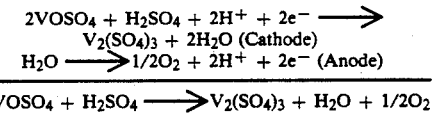

$$2VOSO_4 + H_2SO_4 + 2H^+ + 2e^- \longrightarrow$$
$$V_2(SO_4)_3 + 2H_2O \text{ (Cathode)}$$
$$H_2O \longrightarrow 1/2 O_2 + 2H^+ + 2e^- \text{ (Anode)}$$

$$2\ VOSO_4 + H_2SO_4 \longrightarrow V_2(SO_4)_3 + H_2O + 1/2 O_2$$

In the foregoing example, acid is consumed at the cathode, thus causing an increase in pH. This effect must be taken into account for continuous operation of the overall system.

Taken together, lead or lead alloy cathode 15, microporous glass barrier 20, and vanadium sulfate and sulfuric acid catholyte 14 have important advantages for use in the exemplary system for restoring solderability. The combination of a lead or lead alloy cathode 15 and sulfate-containing catholyte 14 provides cathode stability under variable conditions and solution stability under the acidic conditions needed for metallic oxide reduction. The stability of sulfate ion against anodic oxidation permits water electrolysis to be the anodic reaction so that protons are generated to replace those used in metallic oxide reduction. Only oxygen is generated as a by-product. Microporous glass barrier 20 ensures that metal cations from catholyte 14 are effectively prevented from entering anolyte 16 so that there are no significant anodic side reactions that would disturb the chemical balance in the system. The combination of vanadium and sulfate provides efficient regeneration and fast metallic oxide discharge rates, avoids transport of cations to the anolyte, and circumvents strong adsorption on the solderable surface of species that degrade solderability.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. A reducing agent regenerating system, comprising:
a vessel having two compartments;
a catholyte solution contained in a first of said compartments, said catholyte including a reducing agent subject to being oxidized in the course of a chemical or electrochemical process;
a cathode placed in said catholyte, said cathode comprising a material having a high hydrogen overvoltage;
an anolyte solution contained in a second of said compartments;
an inert anode placed in said anolyte;
a semipermeable ionic barrier separating said first and second compartments, said ionic barrier allowing migration of protons from said anolyte to said catholyte but opposing migration and diffusion of cations from said catholyte to said anolyte; and
said cathode electrochemically regenerating the reducing agent after it has been oxidized.

2. The system of claim 1, wherein the reducing agent comprises a reduced member of a redox couple selected from the group of materials consisting of vanadium, chromium, and europium ions.

3. The system of claim 1, wherein said cathode comprises a material selected from the group of materials consisting of lead, mercury, indium, antimony, tantalum, bismuth, arsenic, carbon, cadmium, thallium, tin, and alloys thereof.

4. The system of claim 1, wherein said catholyte comprises a sulfate solution and said anolyte comprises a sulfuric acid ($H_2SO_4$) solution.

5. The system of claim 1, wherein said catholyte comprises vanadium sulfate and sulfuric acid, said cathode comprises a material selected from the group of materials consisting of lead and lead alloys, and said ionic barrier comprises a microporous glass separator.

6. A system for regenerating a reducing agent used in restoring solderability of an electronic component, comprising:
a vessel having two compartments;
a catholyte solution contained in a first of said compartments, said catholyte including a redox couple comprising a reduced member and an oxidized member, said reduced member of said redox couple comprising the reducing agent;
a cathode placed in said catholyte, said cathode comprising a material having a high hydrogen overvoltage;
an anolyte solution contained in a second of said compartments;
an inert anode placed in said anolyte;
a semipermeable ionic barrier separating said first and second compartments, said ionic barrier allowing migration of protons from said anolyte to said catholyte but opposing migration and diffusion of cations from said catholyte to said anolyte;
a solderable portion of the electronic component placed in contact with said catholyte, said reduced member of said redox couple reducing metallic oxides on said solderable portion of the electronic component while being oxidized to said oxidized member; and
said cathode electrochemically regenerating the reducing agent by reducing said oxidized member of said redox couple back to said reduced member.

7. The system of claim 6, wherein said redox couple is selected from the group of materials consisting of vanadium, chromium, and europium ions.

8. The system of claim 6, wherein said cathode comprises a material selected from the group of materials consisting of lead, mercury, indium, antimony, tantalum, bismuth, arsenic, carbon, cadmium, thallium, tin, and alloys thereof.

9. The system of claim 7, wherein said catholyte comprises a sulfate solution and said anolyte comprises a sulfuric acid ($H_2SO_4$) solution.

10. The system of claim 9, wherein said cathode comprises a material selected from the group of materials consisting of lead and lead alloys.

11. The system of claim 6, wherein said ionic barrier comprises a microporous glass separator.

12. The system of claim 6, wherein said catholyte comprises vanadium sulfate and sulfuric acid, said cathode comprises a material selected from the group of materials consisting of lead and lead alloys, and said ionic barrier comprises a microporous glass separator.

13. A method of regenerating a reducing agent, comprising the steps of:
providing a vessel having two compartments;
providing a catholyte solution in a first of said compartments, said catholyte including a reducing agent subject to being oxidized to an oxidized state in the course of a chemical or electrochemical process;
placing a cathode in said catholyte, said cathode comprising a material having a high hydrogen overvoltage;
providing an anolyte solution in a second of said compartments;
placing an inert anode in said anolyte;
separating said first and second compartments with a semipermeable ionic barrier, said ionic barrier allowing migration of protons from said anolyte to said catholyte but opposing migration and diffusion of cations from said catholyte to said anolyte; and
electrochemically regenerating the reducing agent from said oxidized state at said cathode.

14. The method of claim 13, wherein the step of providing a catholyte comprises providing a catholyte including a redox couple having a reduced member comprising the reducing agent and an oxidized member comprising said oxidized state.

15. The method of claim 14, wherein the step of placing said cathode in said catholyte further comprises selecting said cathode from the group of materials consisting of lead, mercury, indium, antimony, tantalum, bismuth, arsenic, carbon, cadmium, thallium, tin, and alloys thereof.

16. The method of claim 15, wherein the step of providing said catholyte comprises providing a solution of vanadium sulfate and sulfuric acid.

17. The method of claim 16, wherein the step of providing said anolyte comprises providing a sulfuric acid ($H_2SO_4$) solution.

18. The method of claim 17, wherein the step of separating said first and second compartments with a semipermeable ionic barrier comprises separating said compartments with a microporous glass separator.

* * * * *